Patented Aug. 10, 1937

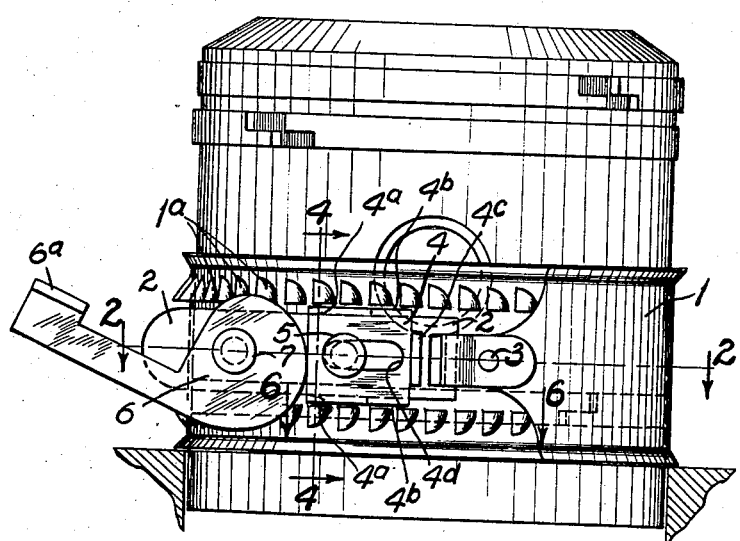

2,089,641

UNITED STATES PATENT OFFICE 2,089,641

COMPRESSOR FOR PISTON RINGS

George S. Cox, St. Louis, Mo.

Application July 2, 1934, Serial No. 733,444

5 Claims. (Cl. 29—86.4)

This invention relates to a compressor for piston rings such as are used in gasoline motors, but is not necessarily restricted thereto.

It is an object of this invention to provide a compressor of universal scope, which will compress the piston rings in the ring grooves of various diameters, for quick assembly in a cylinder block.

It is a further object of my invention to provide means for locking the mechanism when compressing the piston rings.

Other and important objects of this invention will be apparent from the disclosures in the drawing and the specification.

The invention, in a preferred form, is illustrated in the drawing and hereinafter more fully described.

In the drawing:

Fig. 1 is a view showing the compressor in locked position holding a piston ring in compressed position on a piston.

Fig. 2 is a section taken on the line 2—2 of Fig. 1.

Fig. 3 is a view showing the compressor in released position.

Fig. 4 is a sectional view of the compressor taken on the line 4—4 of Fig. 1.

Fig. 5 is a detail view of the sliding clamp made use of.

Fig. 6 is a detail fragmental section of the flexible band of the compressor, showing the stops on its periphery.

As shown in the drawing:

The compressor consists of a flexible band 1 having one or more series of stops 1a extending outwardly around a portion of its periphery and adjacent and parallel its edges, which edges are flared outwardly. One end of the band 1 is preferably reduced in width and formed into a loop secured by the rivet 3, and carried by this loop is the lock bar 2. The lock bar is provided with two openings in which the studs or rivets 5 and 7 are secured. A slide clamp 4 provided with a slot 4d is carried by the stud 5 which projects through the slot in such a manner as to permit it to move longitudinally of the lock bar.

The slide clamp is provided with outwardly extending teeth 4a which are adapted to engage certain of the stops 1a on the flexible band 1. The slide clamp 4 is provided with guide lugs 4b which fit on opposite sides of the lock bar 2 and prevent the slide clamp from rotating on the stud 5. The slide clamp is also provided with a lug or projection 4c which forms a finger grip. A cam lever 6 is provided with an opening by means of which it is fulcrumed on the stud 7 carried by the lock bar 2. Said cam lever is provided at one end with an irregularly curved edge or cam for contacting one end of the slide clamp, so that the flexible band 1 can be drawn taut around a piston when the cam lever 6 is operated on its fulcrum. The opposite end of the cam lever is provided with a thumb grip or lug 6a so that the cam lever can be easily operated.

In the operation of the device, the piston rings are first placed around the piston and in the ring grooves in the usual manner. The compressor is then placed around the lowest piston ring, with the cam lever 6 in open position (see Fig. 3). The compressor is then pressed around the piston with one hand, while with the other hand the slide clamp 4 is moved to the left as shown in Fig. 3, until the teeth 4a are brought in contact with the farthest set of stops 1a possible on the flexible band 1. The cam lever 6 is then rotated on the stud 7, bringing the irregularly curved or cam edge in contact with the end of the slide clamp 4. A continued movement of the cam lever 6 causes pressure to be exerted against the slide clamp 4, but since the teeth 4a are in engagement with certain of the stops 1a, there is no movement of the slide clamp; but instead, the lock bar 2 is drawn to the left, thereby drawing the band 1 tightly around the piston and ring, compressing the latter into the ring groove. The lower end of the piston is then inserted into a cylinder bore, till the lower flared edge of the band 1 contacts the upper face of the engine block (see Fig. 1). The cam lever 6 is then moved to release the band 1, so that the piston and compressed ring can be pushed or tapped down into the cylinder; after this has been done the band is loosened and placed around the upper rings, where the operation previously described is repeated. The flare of the edges of the band not only prevents the band from entering the cylinder bore, but also tends to make the band less liable to distortion and permits the use of thinner material; and furthermore, by flaring both edges of the band, my device can be used either right or left-handed, as found most convenient by the mechanic using the same.

A particular advantage of my device is that being constructed of relatively light material, the band is drawn around the piston instead of being squeezed, as is often the case with compressors now in use.

Having fully described my invention, what I claim is:

1. A piston ring compressor comprising a flexible band, a lock plate carried by one end of said band, outwardly extending projections formed on the face of said band, sliding means on said lock plate for engaging certain of said projections, and means for exerting pressure against one end of said slide plate, thereby moving said lock plate and contracting said band.

2. A piston ring compressor comprising a flexible band having a plurality of projections on a portion of its outer surface, a sliding plate carried at one end of said band and adapted to engage predetermined projections, and means adjacent said sliding plate for exerting pressure against the same, whereby said band is contracted.

3. A piston ring compressor comprising a flexible band having projections formed on its outer periphery adjacent one end, a sliding plate located at the opposite end of said band and adapted for engagement with preselected projections, a cam lever pivotally mounted adjacent one end of said slide plate and adapted to exert longitudinal pressure against said plate, whereby said band is drawn tightly around a piston and piston ring carried thereby.

4. A piston ring compressor comprising a flexible band, a lock plate carried by one end of said band, outwardly extending projections formed on the face of said band parallel to and adjacent its edges, sliding means on said lock plate for engaging certain of said projections, and means for exerting pressure against one end of said sliding means, thereby moving said lock plate and contracting said band.

5. A piston ring compressor comprising a flexible band, a loop formed at one end of said band, a lock bar secured at one end in said loop, outwardly extending projections formed on said band adjacent the remaining end thereof, sliding means mounted on said lock bar and adapted for engagement with said projections, and means rotatably mounted on said lock bar for exerting pressure against one end of said sliding means, thereby moving said lock bar and contracting said band, said rotatably mounted means being capable of holding said band against expansion at any point of its rotation.

GEORGE S. COX.